United States Patent [19]

Stewart

[11] Patent Number: 5,134,956
[45] Date of Patent: Aug. 4, 1992

[54] CHICKEN BREADING MACHINE

[76] Inventor: Billy J. Stewart, 4704 Montgomery Ave., Downers Grove, Ill. 60515

[21] Appl. No.: 433,645

[22] Filed: Nov. 8, 1989

[51] Int. Cl.$^5$ .............................................. A23P 1/08
[52] U.S. Cl. .......................................... 118/22; 118/57; 209/235; 209/335
[58] Field of Search .................. 118/13, 18, 19, 22, 118/24, 26, 30, 56, 57, 417, 418; 209/234, 235, 236, 320, 335, 339, 349, 350; 99/452, 460

[56] References Cited

U.S. PATENT DOCUMENTS

| | | | |
|---|---|---|---|
| 633,423 | 9/1899 | Burns | 209/235 |
| 900,396 | 10/1908 | Lange | 209/349 |
| 1,842,101 | 1/1932 | Kaufmann | 118/19 |
| 1,881,549 | 10/1932 | Hatch | 118/19 |
| 3,225,735 | 12/1965 | Arcabasso | 118/19 |
| 3,696,778 | 10/1972 | Moore | 118/19 |
| 3,709,193 | 1/1973 | Moore | 118/19 |
| 3,739,743 | 6/1973 | McKee, Jr. | 118/19 |
| 3,910,227 | 10/1975 | Reece | 118/31 |
| 4,078,517 | 3/1978 | Castellano et al. | 118/24 |
| 4,458,586 | 7/1984 | Reed | 118/22 |

Primary Examiner—Richard L. Chiesa
Attorney, Agent, or Firm—Cook, Egan, McFarron & Manzo Ltd.

[57] ABSTRACT

A chicken breading machine including a basket, with a mesh bottom, which is adapted to be rocked while holding floured chicken pieces. The mesh bottom of the basket allows loose flour and cracks to fall from the basket. The basket includes at least one tumble bar positioned at or near the bottom of the basket to cause chicken to tumble as the basket is rocked. A rocking device is adapted to rock the basket. A sifting device can be removably positioned below the basket. The sifting device contains a screen to retain cracks and permit flour to sift through the screen so that the flour can be reused without having to manually sift the flour from the cracks.

2 Claims, 4 Drawing Sheets

CHICKEN BREADING MACHINE

The present invention relates to a chicken breading machine which facilitates labor intensive operations in the preparation of chicken for cooking and more evenly breaded chicken parts.

BACKGROUND

The fast food industry in the United States, and elsewhere, has adopted fried chicken as one of its principle products. Prior to cooking the chicken, the chicken parts are breaded, i.e.. are coated with a batter which includes flour and various herbs and spices. The process of coating of the chicken parts with the batter includes several labor intensive strenuous steps, which are as follows:

First the chicken parts are placed in an initial flour tub, where the chicken is tumbled by hand in order to thoroughly coat the chicken with flour. The floured chicken parts are then placed in a Stainless steel mesh basket. The basket is lifted above the flour tub and the basket is shaken by hand. The purpose of the shaking is to remove any lose flour from the chicken. The flour which is shaken off the chicken is allowed to drop back into the flour tub.

Next the floured chicken is subjected a wet wash seasoning. The floured chicken parts are moved to a basket which then is emersed in a wet wash seasoning. The chicken parts are thus submerged in the wet wash seasoning. The basket is removed from the wet wash seasoning and allowed to drain.

Next the wet-washed chicken parts are placed in a second tub containing seasoned flour. The chicken parts are tumbled by hand to thoroughly coat the parts with seasoned flour. The coated chicken parts are then placed in a stainless steel mesh basket which is lifted above the seasoned flour tub and the basket is manually shaken to remove all lose flour from the chicken parts.

This completes the process of breading the chicken parts. After the breading process, the chicken parts are then moved to the cooking operation where the flour, wet wash, seasoned flour coated chicken is cooked to complete breading or batter on the chicken.

It has been found that in processing fried chicken, it is necessary to shake or tumble the chicken parts after they have been floured to eliminate excess flour, and, in particular to eliminate any build up of flour in the pockets and crevices of the chicken parts. For example, chicken wings tend to accumulate an undesirably large accumulation of flour in the interior portions of the joints. If the chicken is cooked with a large accumulation of flour, the accumulated flour forms a lump which does not completely cook and the chicken parts with such lumps are undesirable. Consequently it is essential that the excess flour in the pockets be removed by vigorously shaking the chicken before cooking.

Because chicken parts are processed in batches weighing as much as 15 pounds or more, it is necessary for the breading operator to be able to vigorously shake the entire batch of chicken in a wire mesh basket, while leaning over a tub of flour. This creates a substantial strain on the breading operator and sometimes results in injury to the breading operator.

In order to conserve both the initial flour and the seasoned flour supplies, the excess flour which is removed from the chicken during the shaking operation is allowed to drop back into the respective containers. However, the shaking operation also removes from the chicken, agglomerates of flour and water or agglomerates of flour and chicken bits which separate from the chicken during shaking. These agglomerates are referred to as "cracks". Because the cracks are relatively coarse, it is necessary that the cracks be removed from the flour before the flour is reused. The removal of the cracks requires the flour in the tubs to be sifted periodically. For the initial flour, the flour must be sifted after 20-30 batches of chicken have been floured. Because the seasoned flour contains salt and other seasoning ingredients, it is necessary to sieve the seasoned flour after every 5 to 8 batches of chicken. The sifting of the flour, as presently done, is a time consuming, labor intensive step.

BRIEF DESCRIPTION OF PRESENT INVENTION

The present invention provides a chicken breading machine which may be used to remove excess flour from floured chicken (either with the initial flour or the seasoned flour) without the need for the breading operator to shake a steel basket containing 15 pounds of chicken pieces. It has been found that the excess flour can also be removed by tumbling or rolling the chicken. It has also been found that tumbling or rolling the chicken is preferred because tumbling or rolling does not bruise the chicken, whereas shaking the chicken vigorously, which is required to remove the flour in the present process, can bruise the chicken.

Further, the apparatus of the present invention provides a removable screen for the purpose of sifting the cracks from the reusable flour as the flour is removed from the chicken. This built in screen device eliminates labor intensive steps involved in the sifting operation which is associated with the breading operation of chicken.

BRIEF DESCRIPTION OF THE DRAWINGS

The present invention together with its objects and its advantages, may be best understood by reference to the following detained description, taken in conjunction with the accompanying drawings.

DESCRIPTION OF THE PREFERRED EMBODIMENT

Figure 1:
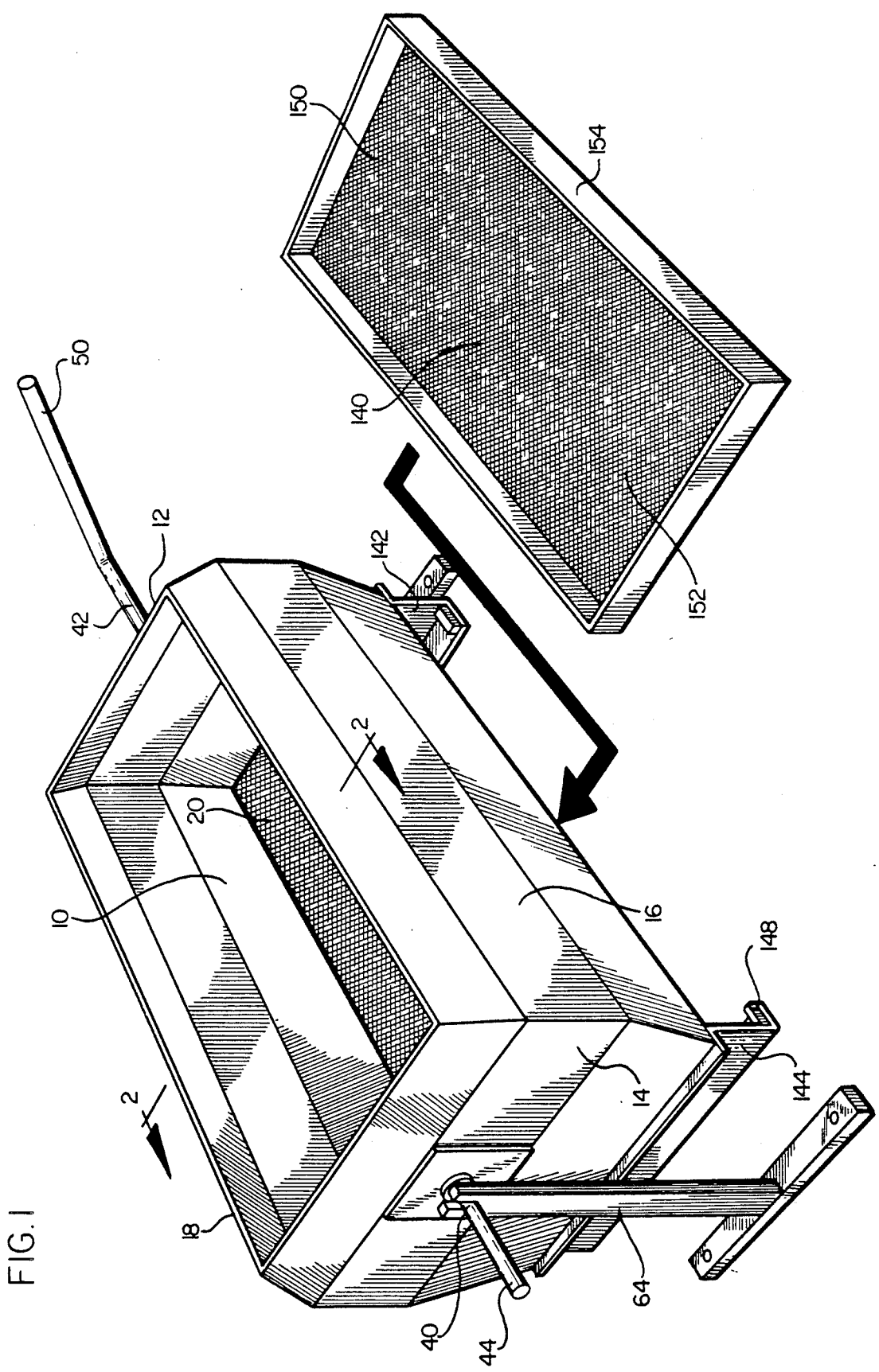
FIG. 1 is an isometric view of the preferred embodiment of the present invention showing the sifting means removed therefrom.
Figure 2:
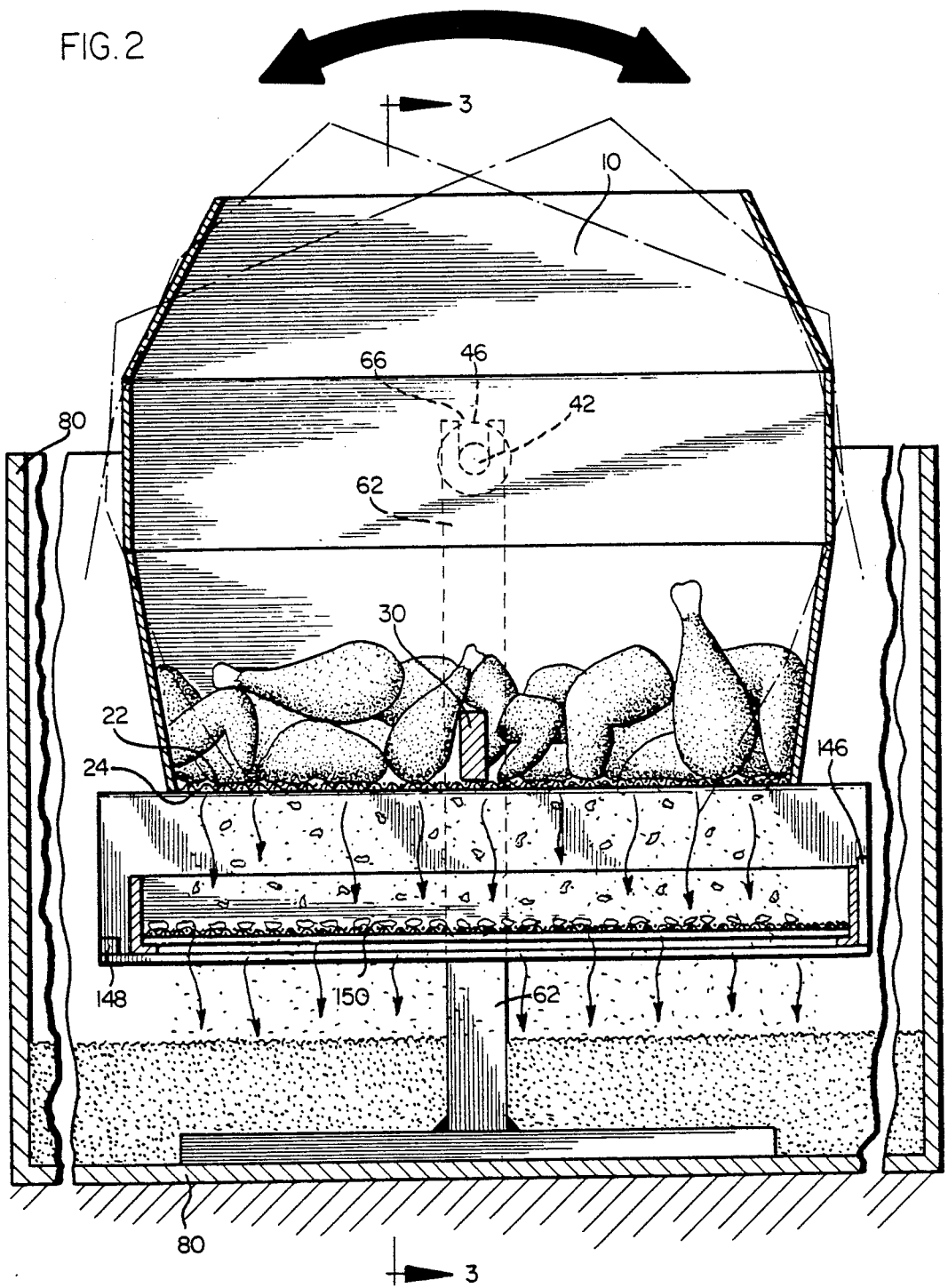
FIG. 2 is a side view of the food breading machine of the present invention taken in section at 2—2 of FIG. 1.
Figure 3:
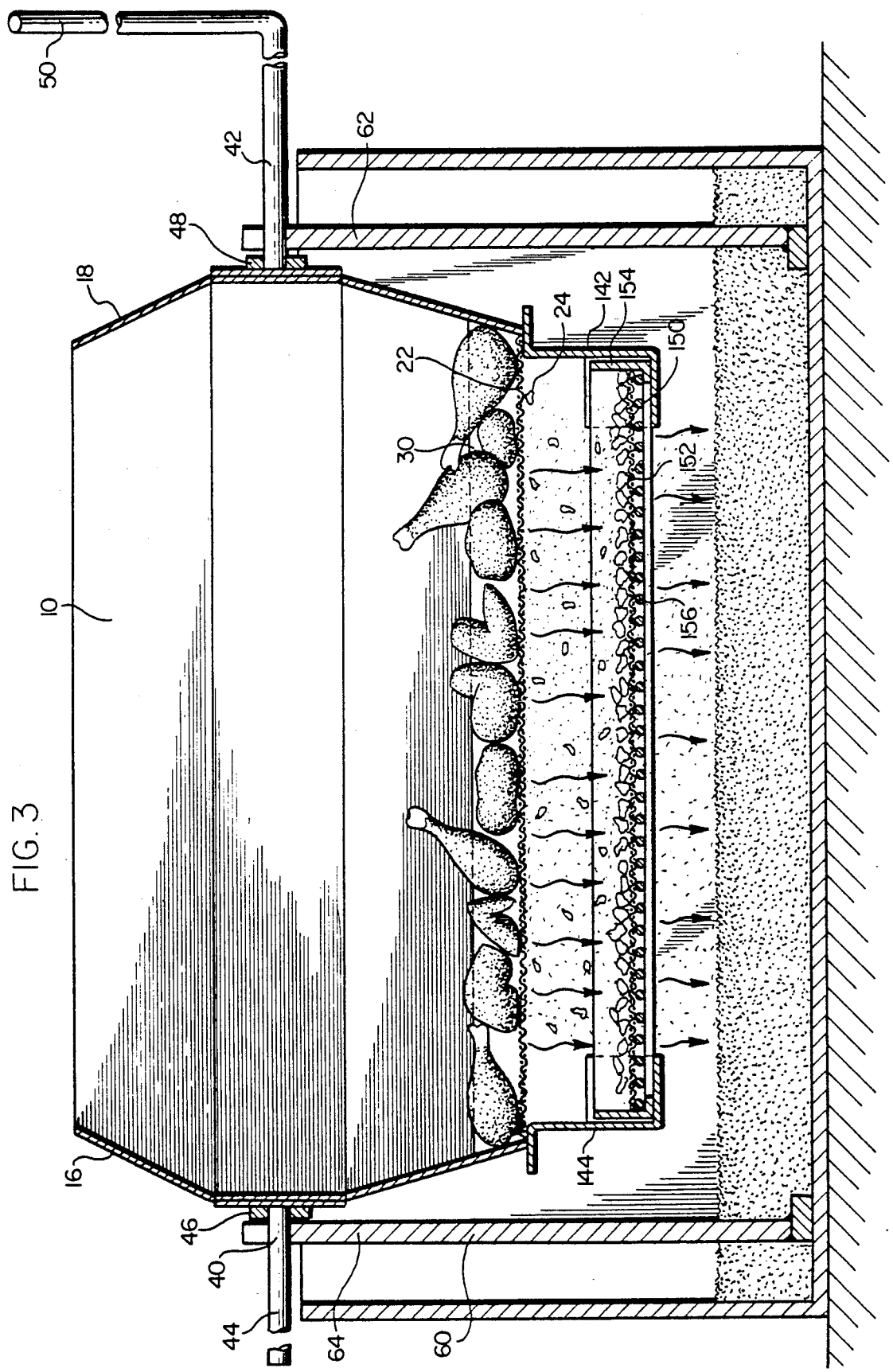
FIG. 3 is a front view of the breading machine of the present invention taken in section 3—3 of FIG. 2.

The chicken breading machine of the present invention comprises a basket, with a mesh bottom, which is adapted to be rocked while holding floured chicken pieces. The rocking motion causes the chicken pieces to move from one side of the basket to the other. The basket of the present invention, must include at least one tumble bar positioned at or near the bottom of the basket in order to prevent the sliding of the chicken from one side to the other, or the basket is rocked. The tumble bar causes the chicken to tumble as the basket is rocked. In the preferred embodiment, the tumble bar is centered on the bottom of the basket and is oriented parallel to the rocking axis of the basket. A plurality of tumble bars can be used, depending upon the size of the bottom of the rocking basket, but it has been found that for commercial chicken breading operations, a single bar, placed midway on the bottom of the rocking basket, parallel to the rocking axis, provides satisfactory operations. The height of the tumble bar may be varied over substantial ranges, chiefly depending upon the size of the food products being breaded. Generally speaking, it has been found that a tumble bar one inch high is satisfactory for use in a chicken breading operation, although for smaller food products such as mushrooms, a smaller bar would be preferred.

The sides and ends of the rocking basket are preferably closed. Closed sides and ends contain the flour inside the basket during the rocking operation and thus avoid creating airborne flour throughout the environment. Closed sides and ends also help to retain the flour above the sieve when the sifting operation option is employed.

Optionally the basket of the present invention may be equipped with a top in order to more completely contain the flour during the rocking operation. Although a variety of covers or tops may be employed, it is preferred to use a rolling top, of the type used in rolled top desks to close the basket. The rolling top style of cover is preferred because it can be opened without removal and without taking up excess space in a busy work environment.

The rocking motion of the basket of chicken breading machine of the present invention may be driven by a motor, if desired. The motor should rock the basket through a selected angular motion at a selected speed, so that the food product being breaded will be adequately rocked and tumbled. Advantageously, the motor may be equipped with a variable timer which allows for adjustment of the number of rocking cycles through which the basket is run before it stops.

The chicken breading machine of the present invention includes basket with closed sides having a mesh bottom suitable to hold floured chicken parts. The basket is affixed to an axle means which allows the basket to be rocked around the axis of the axle and thus causes the floured chicken parts to move back and forth on the bottom of the basket. In order to accomplish the desired tumbling action, the bottom of the basket is equipped with a tumble bar parallel to the axis of the rocking motion of the basket. The tumble bar prevents the chicken from sliding back and forth across the bottom of the basket, directly from one side to the other, but the tumble bar causes the chicken parts to tumble. The tumbling action causes the excess flour to fall from the chicken parts, without bruising the chicken and without the need for the breading operator to shake a heavy steel basket vigorously over a tub of flour.

The preferred embodiment of the chicken breading machine of the present inventor is shown in the accompanying drawings. As shown in FIG. 1, the breading basket 10 includes closed ends 12 and 14 and closed sides 16 and 18 and bottom 20. The basket 10 including ends, sides and bottom is preferably fabricated from metal such as stainless steel. The bottom 20 of basket 10 is made up of a coarse mesh 22. Mesh 22 should have openings large enough to allow loose flour particles and cracks to fall through the mesh, but fine enough to retain the chicken parts upon the bottom 20 of the basket 10. Preferably Mesh 22 has supporting members 24 positioned thereunder in order to keep the bottom of the basket essentially flat.

Tumble bar 30 is mounted adjacent to bottom 20, approximately midway across the bottom, running from end to end.

In the preferred embodiment of the present invention, the rocking means 40 for basket 10 is made up of axle 42 and axle 44 which are joined to sides 16 and 18 by joints 46 and 48 respectively. Axle 42 includes an extension which culminates in lever 50 which extends at approximately 90 degrees to axle 40. Support means 60 preferably includes supports 62 and 64 include detents 66 and 68 which serve to engage axles 42 and 44 to support and position the basket 10 at a selected location above flour tub 80 and to allow basket 10 to be rocked by pivoting the basket on axles 42 and 44 supported by supports 62 and 64.

Supports 62 and 64 may be conveniently mounted within the flour tub 80 which allows the excess flour removed from the chicken parts to fall directly into a tub 80 which serves as a flour container. Alternatively, supports 62 and 64 may be welded or screwed to the sides of flour tub 80. If desired, support 62 and 64 may also be mounted outside the tub. Flour tub 80 is representative of several types of devices which may be used to catch the flour which falls from the chicken parts as the excess flour is removed therefrom. As basket 10 is rocked by pivoting on axles 42 and 44 in supports 62 and 64, basket 10 is moved through 45 degrees (or more) of rotation to either side. The rocking of basket 10 about axles 42 and 44 causes the chicken pieces resting on bottom 20 slide to the downward side of the basket. The slide the chicken pieces is interrupted by tumble bar 30 which causes the chicken to take on a tumbling motion rather than a sliding motion. The ability to create a tumbling motion of the chicken pieces advantageously removes the excess flour from the chicken, while avoiding bruising the chicken. The necessary tumbling of the chicken pieces can be accomplished through minimum effort through reciprocation of the lever 50.

Figure 4:
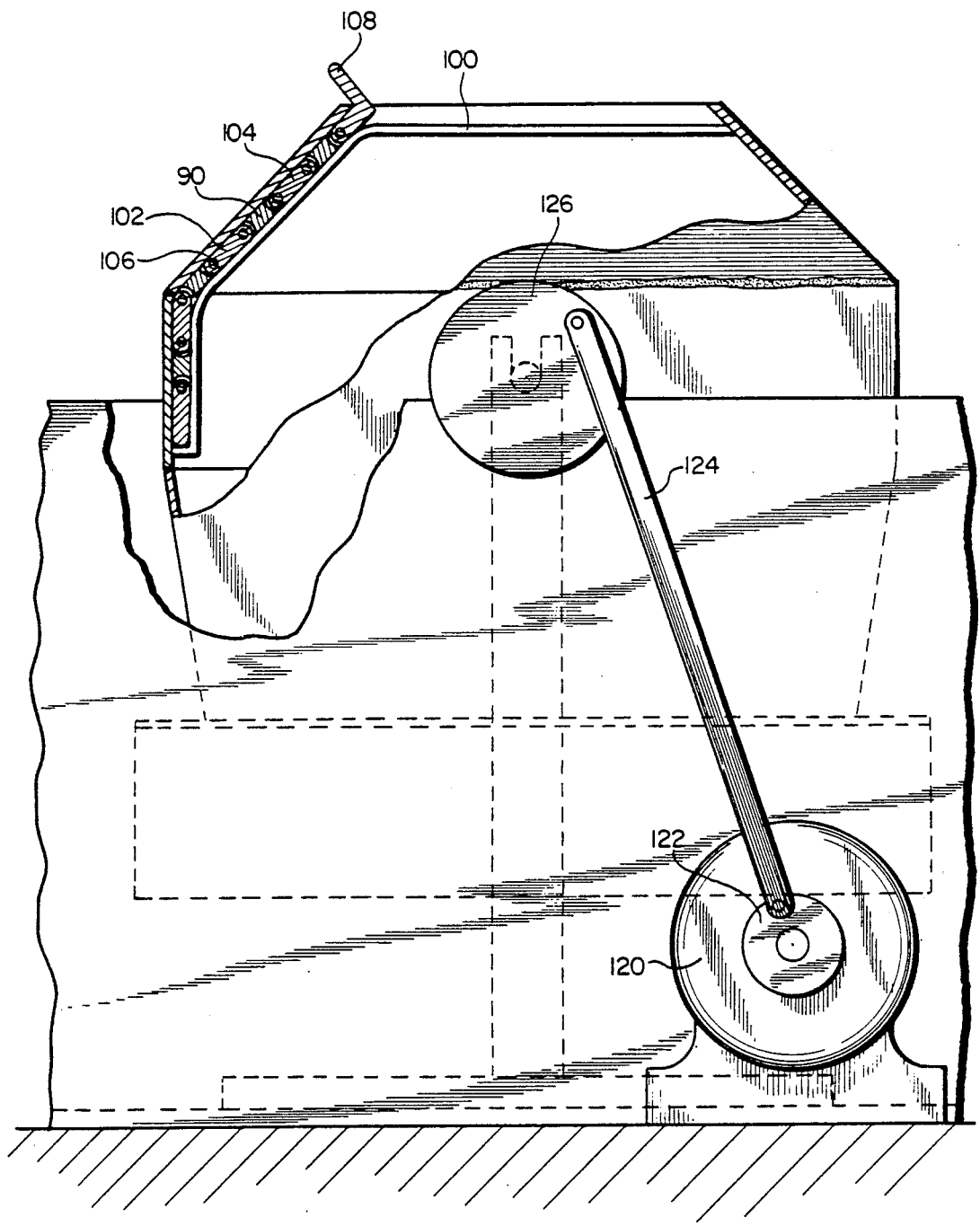
FIG. 4 is a side view of the food breading machine of the present invention, taken in section, showing a second embodiment.

In one embodiment, as shown in FIG. 4, basket 10 may be equipped with a cover 90 which substantially seals the top of the basket during the chicken rocking operation. The use of cover 90 advantageously reduces the amount of flour which is dispersed in the air. Those skilled in the art will understand that a wide variety of covers may be used, but a roll-type, sliding cover of the type shown in FIG. 4 is preferred.

As shown in FIG. 4, track 100 serves as a guide for a roll-top type top 102 which is made up of a series of slats 104, joined by a series of hinges 106, which run from end 12 to end 13. Handle 108 allows cover 102 to be moved into the closed position for the shaking operation, but to be readily opened for removal of the chicken. The roll-top top sliding cover 102 is preferred, since it does not require additional space to open or close the cover.

In another embodiment, the rocking of basket 10 is driven by a motor. A suitable arrangement is shown in FIG. 4 wherein motor 120 drives small wheel 122, connected to arm 124 which drives large wheel 126 affixed to end 12 of basket 10. Rotation of wheel 122 by motor 120 causes wheel 126 to reciprocate and the basket to rock through a selected angular motion. Based on the size of the wheels, the angular rocking motor may be adjusted. The speed of the motor will control the speed of the rocking. Motor 120 need not be mounted below basket 10, as is shown in FIG. 4, but the motor can be mounted to the rear of the basket in a more relatively remote position. Further, it is preferred that the motor and any associated relays, timers, and power equipment be enclosed in a dust proof enclosure with the motor shaft encased in a rubber gromet to avoid dust coming in contact with the motor and electrical equipment. A timer (not shown) can be used to control the motor to cause the basket to rock through a prescribed number of cycles.

In another embodiment shown in FIG. 1, sifter 140 may be conveniently positioned beneath bottom 20 of basket 10 in order to sift the flour falling from the chicken and separate the cracks (which are desirably discarded from the reusable flour). In this embodiment, extension slides 142 and 144 are affixed beneath ends 12 and 14 on basket 10. Back member 146 may depend from side 18 and forms a third side to enclose the sifter. Slides 142 and 144 are adapted to receive sieve 150. Sieve 150 is made up of screen 152 which is mounted within frame 154. In order to hold screen 152 relatively flat within frame 154, reinforcing members 156 may be affixed to frame 154, beneath screen 152. The openings in screen 152 must be small enough to retain the cracks on the surface of screen 152, while permitting the usable flour to fall through screen 152 to the flour tub 80.

The sieve 150 is removably held in slides 142 and 144 between backing member 146 and key 148. This allows the sieve 150 to be inserted into slides 142 and 144 by lifting sieve 150 over key 148 until sieve 150 contacts backing member 146. In this position, sieve 150 is removably held within key 148 and is maintained in the desired position as the rocking of the basket 10 takes place. In this embodiment it is desirable that frame 154 rise above screen 152 to a level close to bottom 20 of basket 10 avoid the dissemination of flour particles in the atmosphere as the rocking of basket 10 takes place.

Those skilled in the art will understand that the breading device of the present invention may be used to apply batters and coatings to foods other than chicken parts. For example, this equipment may be used to put batter on fish, onion rings, mushrooms, and other types of foods prior to cooking.

The forms of invention shown and described herein are to be considered only as illustrative. It would be apparent to those skilled in the art that modifications may be made therein without departing from the spirit of the invention or the scope of the appended claims.

I claim:

1. A machine for breading food pieces, said machine comprising:
   a basket adapted to hold floured pieces of food, said basket having closed sides and a bottom, said bottom having a plurality of openings, said openings being large enough to allow loose flour and cracks to fall from said basket, but being small enough to hold said food pieces upon said bottom;
   rocking means adapted to rock said basket, said rocking means including axle means and support means, said axle means being attached to a side of said basket at a location which urges the basket to remain upright, said support means adapted to engage said axle means and to support said basket in a selected location, said support means and said axle means cooperating to allow said basket to rock about the axis defined by said axle means while maintaining the basket in the selected location;
   tumble means adapted to cause said food pieces to tumble as said basket is rocked, said tumble means comprising a bar within said basket adjacent to the bottom of said basket, said bar positioned approximately parallel to said axis;
   a sifting means associated with said basket, said sifting means being removably positioned below the bottom of said basket, said sifting means including a screen adapted to retain cracks, but permit flour to sift through said screen.

2. A machine for breading food pieces as described in claim 1, wherein said sifting means includes a frame which extends upwardly from said screen proximate to said bottom of said basket.

* * * * *